United States Patent
Dhodapkar et al.

(10) Patent No.: US 8,214,602 B2
(45) Date of Patent: Jul. 3, 2012

(54) EFFICIENT LOAD QUEUE SNOOPING

(75) Inventors: Ashutosh S. Dhodapkar, Fremont, CA (US); Michael G. Butler, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1002 days.

(21) Appl. No.: 12/143,985

(22) Filed: Jun. 23, 2008

(65) Prior Publication Data

US 2009/0319727 A1  Dec. 24, 2009

(51) Int. Cl.
G06F 12/00 (2006.01)

(52) U.S. Cl. ........ 711/146; 711/156; 711/136; 711/133; 711/145; 711/E12.026; 711/128; 712/216; 712/218

(58) Field of Classification Search .................. None
See application file for complete search history.

(56) References Cited

U.S. PATENT DOCUMENTS

| | | | |
|---|---|---|---|
| 5,748,937 A * | 5/1998 | Abramson et al. | 712/218 |
| 5,802,575 A | 9/1998 | Greenley et al. | |
| 5,854,914 A * | 12/1998 | Bodas et al. | 712/216 |
| 6,360,314 B1 | 3/2002 | Webb et al. | |
| 6,473,837 B1 | 10/2002 | Hughes et al. | |
| 6,622,235 B1 | 9/2003 | Keller et al. | |
| 6,662,280 B1 * | 12/2003 | Hughes | 711/156 |
| 6,857,048 B2 * | 2/2005 | Rankin et al. | 711/133 |
| 2007/0028055 A1 * | 2/2007 | Tanaka et al. | 711/136 |

FOREIGN PATENT DOCUMENTS

| | | |
|---|---|---|
| EP | 0742512 | 11/1996 |
| EP | 0785504 | 7/1997 |
| WO | 98/02803 | 1/1998 |
| WO | 0135212 | 5/2001 |

OTHER PUBLICATIONS

International Search Report from PCT/US2009/003724 mailed Jan. 13, 2011, 8 pages.
Anonymous: "Memory disambiguation" Wikipedia, The Free Encyclopedia, [online] Oct. 6, 2006, XP002546468, Retrieved from the Internet: URL: http//en.wikipedia.org/w/index.php?title=Memory_disambiguation&oldid=80568393>.
International Seach Report for PCT/US2009/003724, dated Oct. 8, 2009.
Examination Report from Application No. 09 788 816.8, dated Nov. 17, 2011, Advanced Micro Devices, Inc., all pages.

* cited by examiner

*Primary Examiner* — Reginald Bragdon
*Assistant Examiner* — Arvind Talukdar
(74) *Attorney, Agent, or Firm* — Lawrence J. Merkel; Meyertons, Hood, Kivlin, Kowert & Goetzel, P.C.

(57) ABSTRACT

In one embodiment, a processor comprises a data cache and a load/store unit (LSU). The LSU comprises a queue and a control unit, and each entry in the queue is assigned to a different load that has accessed the data cache but has not retired. The control unit is configured to update the data cache hit status of each load represented in the queue as a content of the data cache changes. The control unit is configured to detect a snoop hit on a first load in a first entry of the queue responsive to: the snoop index matching a load index stored in the first entry, the data cache hit status of the first load indicating hit, the data cache detecting a snoop hit for the snoop operation, and a load way stored in the first entry matching a first way of the data cache in which the snoop operation is a hit.

18 Claims, 6 Drawing Sheets

| Hit Bit | Cache Hit | Index Match | Way Match | R Bit |
|---|---|---|---|---|
| 0 | x | 0 | x | 0 |
| 0 | x | 1 | x | 1 |
| 1 | 0 | 0 | x | 0 |
| 1 | 0 | 1 | x | 0 |
| 1 | 1 | 0 | x | 0 |
| 1 | 1 | 1 | 0 | 0 |
| 1 | 1 | 1 | 1 | 1 |

64

| MA Bit | Index2 Match | R Bit |
|---|---|---|
| 0 | x | 0 |
| 1 | 0 | 0 |
| 1 | 1 | 1 |

| Hit Bit | Cache Hit | Index Match | Way Match | Alias Match |
|---|---|---|---|---|
| 0 | x | x | x | 0 |
| 1 | 0 | x | x | 0 |
| 1 | 1 | 0 | x | 0 |
| 1 | 1 | 1 | x | 0 |
| 1 | 1 | 1 | 1 | 1 |

— 90

| Hit Bit | Index Match | Way Match | Fill Match |
|---|---|---|---|
| 0 | x | x | 0 |
| 1 | 0 | x | 0 |
| 1 | 1 | 0 | 0 |
| 1 | 1 | 1 | 1 |

— 92

| Hit Bit | Alias Match | Fill Match | New Hit Bit |
|---|---|---|---|
| 0 | x | x | 0 |
| 1 | 1 | x | 0 |
| 1 | x | 1 | 0 |
| 1 | 0 | 0 | 1 |

EFFICIENT LOAD QUEUE SNOOPING

BACKGROUND

1. Field of the Invention

This invention is related to the field of processors and, more particularly, to load processing and memory ordering maintenance in processors.

2. Description of the Related Art

Processors generally use memory operations to move data to and from memory. The term "memory operation" refers to an operation which specifies a transfer of data between a processor and memory (although the transfer may be accomplished in cache). Load memory operations specify a transfer of data from memory to the processor, and store memory operations specify a transfer of data from the processor to memory. Load memory operations may be referred to herein more succinctly as "loads", and similarly store memory operations may be referred to as "stores". Memory operations may be implicit within an instruction which directly accesses a memory operand to perform its defined function (e.g. arithmetic, logic, etc.), or may be an explicit instruction which performs the data transfer only, depending upon the instruction set employed by the processor.

Some instruction set architectures require strong ordering of memory operations (e.g. the x86 instruction set architecture). Generally, memory operations are strongly ordered if they appear to have occurred in the program order specified. Processors often attempt to perform loads out of (program) order to improve performance. However, if the load are performed out of order, it is possible to violate strong memory ordering rules.

For example, if a first processor performs a store to address A1 followed by a store to address A2 and a second processor performs a load to address A2 (which misses in the data cache of the second processor) followed by a load to address A1 (which hits in the data cache of the second processor), strong memory ordering rules may be violated. Strong memory ordering rules require, in the above situation, that if the load to address A2 receives the store data from the store to address A2, then the load to address A1 must receive the store data from the store to address A1. However, if the load to address A1 is allowed to complete while the load to address A2 is being serviced, then the following scenario may occur: (i) the load to address A1 may receive data prior to the store to address A1; (ii) the store to address A1 may complete, (iii) the store to address A2 may complete, and (iv) the load to address A2 may complete and receive the data provided by the store to address A2. This outcome would be incorrect.

SUMMARY

In one embodiment, a processor comprises a data cache and a load/store unit (LSU) coupled to the data cache. The LSU comprises a queue, and each entry in the queue is assigned to a different load that has accessed the data cache but has not retired. The LSU further comprises a control unit coupled to the queue, and the control unit is configured to update the data cache hit status of each load represented in the queue as a content of the data cache changes. The LSU is coupled to receive a snoop index, where an index is the subset of address bits that are used to index into the cache. The snoop index corresponds to a snoop operation received by the processor, and the control unit is configured to detect a snoop hit on a first load in a first entry of the queue responsive to: the snoop index matching a load index stored in the first entry, the data cache hit status of the first load indicating hit, the data cache detecting a snoop hit for the snoop operation, and a load way stored in the first entry matching a first way of the data cache in which the snoop operation is a hit. The load way is a way of the data cache in which the load hits.

In an embodiment, a processor comprises a data cache and a load/store unit (LSU) coupled to the data cache. The LSU comprises a queue, and each entry in the queue is assigned to a different load that has accessed the data cache but has not retired. The LSU further comprises a control unit coupled to the queue, and the control unit is configured to update the data cache hit status of each load represented in the queue as a content of the data cache changes. The LSU is coupled to receive a snoop index corresponding to a snoop operation received by the processor, and the control unit is configured to detect a snoop hit on a first load in a first entry of the queue in at least two cases: (i) responsive to the snoop index matching a load index stored in the first entry, the data cache hit status of the first load indicating hit, and the data cache detecting a snoop hit for the snoop operation; and (ii) responsive to the snoop index matching the load index and the data cache hit status of the first load indicating not hit, independent of whether or not the snoop operation hits in the data cache.

BRIEF DESCRIPTION OF THE DRAWINGS

The following detailed description makes reference to the accompanying drawings, which are now briefly described.

FIG. 4 is a truth table illustrating operation of one embodiment of the processor for a snoop.

FIG. 6 is a truth table illustrating operation of one embodiment of the processor to monitor loads in the load queue.

Figure 1:
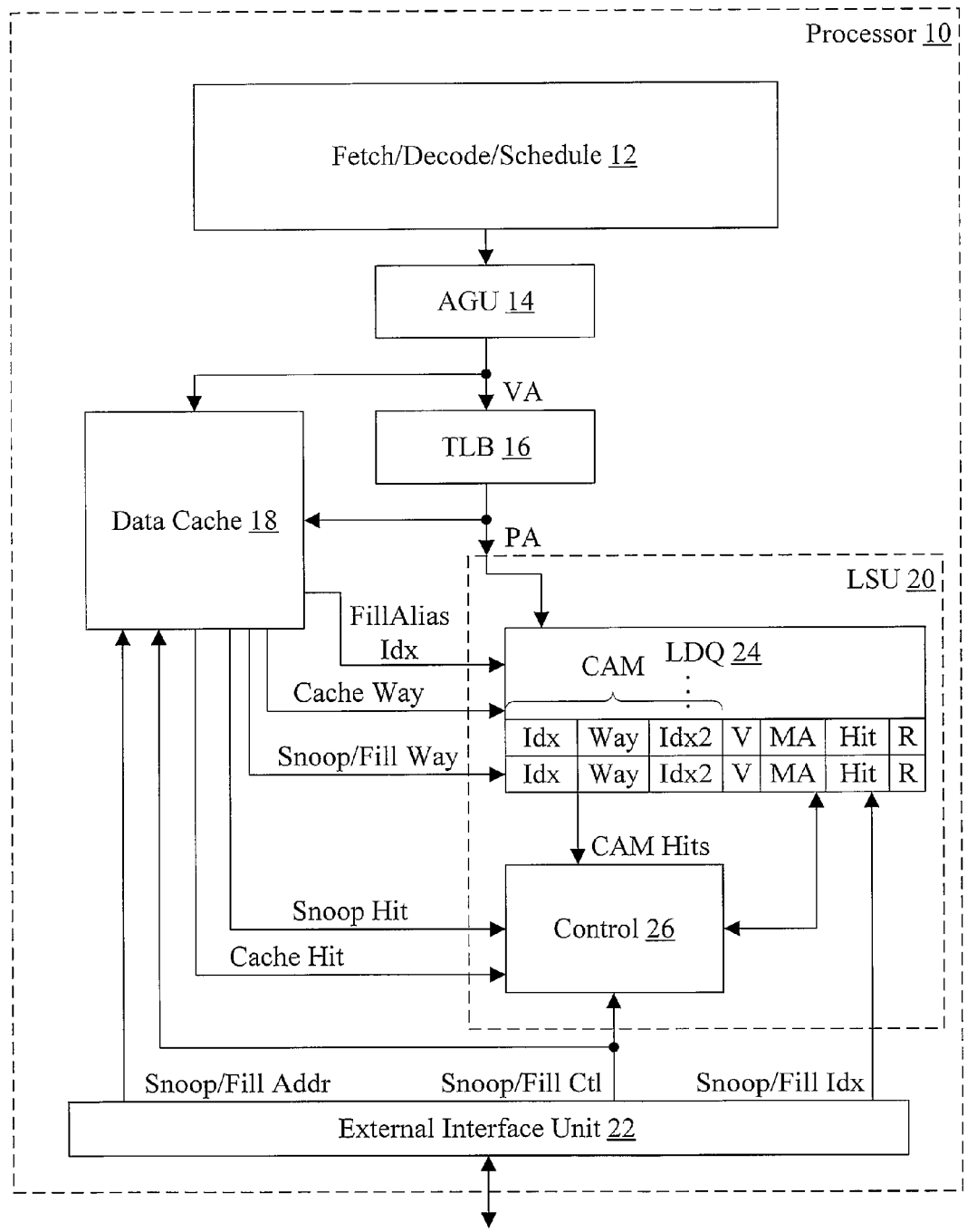
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In one embodiment, a processor's load/store unit (LSU) implements a load queue having a plurality of entries. Each entry is assigned to a different load, and, if the entry is marked valid, the load has accessed the processor's data cache but has not yet retired by committing its results to architected state of the processor (e.g. an architected register that is a destination of the instruction).

Data caches are finite storage in which some loads and stores will miss. A memory operation is a "hit" in a cache if the data accessed by the memory operation is stored in cache at the time of access, and is a "miss" if the data accessed by the memory operation is not stored in cache at the time of access. When a load misses a data cache, the data is typically loaded into the cache using a cache fill operation to read the missing cache line from memory and store it in the cache. Data is stored in caches in units referred to as "cache lines", which are the minimum number of contiguous bytes to be allocated and deallocated storage within the cache.

The LSU may initialize the data cache hit status of the load in the load queue with the hit/miss result of the load during the data cache access. The LSU may then track the data cache hit status of the load in the assigned queue entry as the data cache contents change (while the load is still represented in the queue and thus is not retired). For example, if the load is a cache hit at the time of access but the cache line that is hit by the load is invalidated, then data cache hit status in the assigned load queue entry may be changed from "hit" to "not hit". The cache line may be invalidated when overwritten by a cache fill of another cache line, for example, or may be invalidated due to a back probe to eliminate possible aliases to a cache line provided in a cache fill. In some embodiments, the LSU may also track the cache fills themselves and may change a data cache hit status of the load from "not hit" to "hit" if the cache line accessed by the load is written to the cache in a fill. In such an embodiment, the "not hit" state may be "miss", since the hit/miss state is known accurately at all times. Other embodiments may not update the data cache hit status of a load that missed the data cache on its initial data cache access to a hit. In such cases, the data cache hit status of "not hit" indicates that the load is not known to hit. It may be a miss, or it may be a hit (e.g. due to a cache fill that occurred after the load accessed the data cache). Viewed in another way, the "not hit" status indicates that the cache hit/miss status of the load is unknown. In either case, the "hit" status indicates that the load is currently a cache hit. It is noted that a load may be referred to as represented in the queue entry, because the queue entry may not actually store the load itself, but rather data related to the load (such as the index, the way, the data cache hit status, etc.). While the description herein may sometimes refer to the load in the queue or queue entry, the load may generally be represented in the entry rather than actually being stored in the entry.

The LSU may use the data cache hit status in the queue entry for a load and the cache hit/miss results of a snoop operation in the data cache to detect snoop hit/miss on that load without comparing the entire address of the snoop operation to the address accessed in response to the load operation (the "load address"). More particularly, the load queue may store the portion of the load address that identifies an entry or entries in the data cache that are eligible to store the cache line identified by the load address. This portion of the load address is referred to as the "index". Additionally, for set associative data caches, the "way" in which the load hits may also be stored if a cache hit is detected. The "way" identifies which of the eligible storage locations (the "set") is actually storing the cache line. If the data cache hit status for a given load is hit, the load index in the queue entry for the given load matches the corresponding portion of the snoop address (the "snoop index"), the snoop operation hits in the data cache, and the way hit by the snoop operation in the data cache 18 matches the load way in the queue entry, then the snoop operation is a snoop hit on the given load. If the data cache hit status of the given load is hit and any of the other factors mentioned previously are not true, then the snoop operation is known to miss the given load. Accordingly, an accurate snoop hit result may be calculated for loads that have a data cache hit status of hit. Since most loads hit in the data cache for most workloads, the result may approximate a solution in which a full address compare is performed.

In the case that the data cache hit status is not hit, the snoop index may be IS compared to the load index in the load's queue entry. An index match may be treated as a snoop hit. The snoop hit may be incorrect, but taking corrective action for a presumed snoop hit may not affect functionality (only performance). Accordingly, a correct result is generated in these cases.

If a snoop hit is detected on a load (and the snoop is responsive to a store by another processor or other entity than the snooping processor), then it is possible that a strong memory ordering violation has occurred if the load is not the oldest load outstanding in the load queue. In one embodiment, each entry includes a resync indication (e.g. a resync bit) that can be set to indicate that the load is to be resynchronized. Resynchronization may generally refer to repeating the load's cache access and forwarding of the load data to its destination, and reexecuting at least those operations that are dependent on the load. Repeating the load that had the snoop hit detected may permit the modified data (assuming the load data was modified by the operation that caused the snoop) to be forwarded and new results of the dependent instructions to be generated. Thus, the load appears to have occurred after the store. Additionally, if the store occurs before a preceding load in the load queue (e.g. the preceding load is a cache miss) and the snoop hit load was performed out of order with regard to the preceding load, the snoop hit load appears to have been performed in order with the preceding load via the resynchronization. Thus, strong ordering may be maintained.

The resynchronization may be performed in any fashion. For example, each operation subsequent to the resynchronizing load operation may be flushed and the corresponding instructions refetched (or rescheduled, if still stored in the scheduling hardware in the fetch/decode/schedule unit 12). Alternatively, if dependency chains are detected in the scheduler, only the dependent instructions need be rescheduled to generate the correct results.

The embodiments described below may use a set associative data cache implementation. However, a direct-mapped data cache implementation may also be used, in other embodiments. For the direct-mapped implementation, the "way" comparison may be eliminated. If the load index matches the snoop index, the cache snoop hit result and the data cache hit status may be used to determine if a snoop hit occurs (e.g., a snoop cache hit and a data cache hit status of hit indicates a snoop hit, and a snoop cache miss and a data cache hit status of hit indicates no snoop hit). If the data cache hit status is "not hit", a match from the index comparison may be treated as a snoop hit independent of the snoop hit/miss result in the data cache.

A snoop operation may generally be any operation communicated to a processor as part of a cache coherence protocol, to ensure that any cached copies of data being manipulated according to the protocol remain coherent with the manipulated data. For example, some protocols may include the transmission of explicit probe commands from a point of coherence (e.g. a home node of the cache line, a memory controller, etc.), and the processor may snoop in response to the probe command and provide a probe response. In bus-based implementations, the probe command may be a defined bus cycle and the probe response may be transmitted in a response phase of the bus cycle. In a packet-based implementation or point-to-point implementation, the probe and probe response may each be packets or point-to-point commands. In other protocols, the operations (e.g. read or write operations) initiated by other processors may themselves be snooped from an interconnect to which the processors are coupled, and the snooping processor may take appropriate action based on the snooped read/write operation and the result of snooping the address. In one embodiment, snoop operations that cause the cache line to be invalidated are checked against the load queue. Such snoop operations are the result of another processor attempting to change the corresponding data in the cache line (e.g. with one or more stores), or are the result of another entity (e.g. a peripheral device) changing the data (e.g. with a direct memory access (DMA) write). In general, any snoop operation that indicates an update of the snooped cache line may be snooped against the load queue to detect a possible resynchronization.

Turning now to FIG. 1, a block diagram of one embodiment of a processor 10 is shown. In the illustrated embodiment, the processor 10 includes a fetch/decode/schedule unit 12, an address generation unit (AGU) 14, a translation lookaside buffer (TLB) 16, a data cache 18, an LSU 20, and an external interface unit 22. The LSU 20 includes a load queue (LDQ) 24 and a control unit 26 that is coupled to the load queue 24. The LSU 20 may also include other components (e.g. a store queue for stores, a queue for additional load data, various other load/store handling circuitry, etc.). In the illustrated embodiment, the fetch/decode/schedule unit 12 is coupled to the AGU 14, which is coupled to the TLB 16 and the data cache 18. The TLB 16 is coupled to the data cache 18 and to the LSU 20 (and more particularly to the load queue 24). The data cache 18 is coupled to the LSU 20 (and more particularly the load queue 24 and the control unit 26) and the external interface unit 22, which is further coupled to the LSU 20 (and more particularly the control unit 26 and the load queue 24).

The fetch/decode/schedule unit 12 may generally include the circuitry that fetches instructions, decodes each instruction into one or more operations to be executed, and schedules operations for execution by the processor 1O. Various execution hardware may be provided for non-load/store operations (e.g. integer, floating point, multimedia, etc., not shown in FIG. 1). The fetch/decode/schedule unit 12 may comprise any desired structure and operation. For example, the fetch/decode/schedule unit 12 may comprise a reservation station/reorder buffer configuration or a centralized scheduler configuration. The fetch/decode/schedule unit 12 may implement register renaming, if desired. The fetch/decode/schedule unit 12 may comprise an instruction cache, and may be coupled to the external interface unit 22 to transmit cache fills for instruction cache misses.

For loads and stores, the fetch/decode/schedule unit 12 may schedule the operations for execution by the AGU 14. The AGU 14 may receive the address operands of the load/store operation, and may generate the virtual address (VA) of the load/store operation. The address operands may be provided from the fetch/decode/schedule unit 12, or may be bypassed from other execution units that are forwarding operand data. There may be more than one AGU 14 in other embodiments. The AGU 14 may provide the virtual address to the TLB 16 and the data cache 18. The data cache 18 may use the virtual address to begin the cache lookup process (e.g. the index bits may be taken from the virtual address bits that are not translated). The TLB 16 may translate the virtual address into a physical address, and may provide the physical address to the data cache 18 for tag comparison to detect hit/miss. Additionally, the physical address may be provided to the LDQ 24, which stores at least the index in a load queue entry assigned to the corresponding load. The index is shown as the Idx field in the load queue 24 entries illustrated in FIG. 1.

Load queue entries may be assigned to loads in any desired fashion. In one embodiment, the entry may be assigned when the corresponding load is scheduled or decoded by the fetch/decode/schedule unit 12. Alternatively, the entries may be assigned as they are received by the LSU 20 during execution. Any assignment scheme may be used.

The data cache 18 may complete the tag comparison, and may signal the cache hit/miss result to the control unit 26 ("Cache Hit" signal in FIG. 1). The data cache 18 may also provide the hitting way to the load queue 24 ("Cache Way" in FIG. 1 and Way field in illustrated load queue 24 entries). The control unit 26 may cause the way to be written to the load queue 24 entry that is assigned to the load. In one embodiment, the cache way may be one-hot encoded to indicate the way. In such an embodiment, the way may be provided with no bits set to indicate a miss, and the control unit 26 may cause the load queue entry to store the cache way provided by the data cache 18 in the way field of the entry independent of the hit/miss signal. The control unit 26 may also initialize a data cache hit status for the load (illustrated in FIG. 1 as a Hit bit, although any representation of the data cache hit status may be used in other embodiments) responsive to whether a cache hit or cache miss is detected. For example, the hit bit may be set to a one to indicate hit, and set to a zero (or cleared) to indicate not hit (or vice versa). A valid bit is also provided to indicate whether or not the entry is valid, and a resync bit indicating whether or not a resynchronization is to be performed for the load (due to a detected snoop hit). When the load is retired, or the oldest load represented in the load queue 24, the processor 10 may perform the resynchronization. For example, the control unit 26 may signal the fetch/decode/schedule unit 12 to resynchronize on the load.

In one embodiment, the LSU 20 may handle misaligned loads as well. Generally, a load is misaligned if at least two non-overlapping accesses are required to perform the load. Misalignment may be defined in any desired fashion. For example, a load may be misaligned if it accesses bytes in two different (generally consecutive in memory) cache lines. Such loads may use two data cache accesses to access bytes in the two cache lines. Other embodiments may use other boundaries to define misaligned loads.

The misaligned (MA) bit may be set in the queue entry assigned to a misaligned load, and the index for the second access of the misaligned load may be stored in the Idx2 field of the entry. That is, the Idx field may store the index of the first portion of the misaligned load, and the Idx2 field may store the index of the second portion of the misaligned load. In some embodiments, data cache hit status and hitting way may be tracked for the second half of the misaligned loads. In the illustrated embodiment, only the index is stored and the second half of the misaligned load is treated as if the data cache hit status is not hit. Misaligned loads may be relatively infrequent, and thus any performance reduction for resynchronizing inaccurately on the second half of a misaligned load is expected to be insignificant.

The queue 24 may be constructed in any desired fashion. For example, in one embodiment, the Idx, Way, and Idx2 fields may be implemented as content addressable memory (CAM) as illustrated in FIG. 1. The remainder of the queue 24 may be random access memory (RAM), or may be implemented in one or more registers, flops, or other clocked storage devices. Any combination of CAM, RAM, registers, flops, and/or other clocked storage devices may be used in various embodiments. Implementing the Idx, Way, and Idx2 fields as CAM may permit the fields to be matched against snoop indexes and snoop ways to detect snoop hits, and also against fill/fill alias indexes and ways to maintain the data cache hit status. The CAM hit/miss results may be provided to the control unit 26.

Particularly, if a load is initially detected as a hit in the data cache 16, the cache line that was hit by the load may subsequently be invalidated (by other than a snoop operation). For example, the cache line may be evicted to store a different cache line provided in a cache fill operation. The external interface unit 22 may provide a fill address to the data cache 18 to perform the fill. The external interface unit 18 may also provide the index of the cache fill to the load queue 24 (Snoop/Fill Idx in FIG. 1). The data cache 18 may indicate which way is being written by the fill (Snoop/Fill Way in FIG. 1). The external interface unit 22 may indicate that the operation is a fill using the Snoop/Fill Ctl interface to the control unit 26 and the data cache 18. If the fill index matches the Idx field, the fill way matches the way field, and the data cache hit status indicates hit for a given entry, the control unit 26 may update the data cache fill status to indicate not hit in that given entry.

In one embodiment, the data cache 18 may indicate way prediction to predict a hitting way for the data cache during an access. If the access is not a hit in the predicted way, it is signalled as a miss and the data cache 18 may initiate a cache fill. It is possible that the access would hit in another (unpredicted) way. In order to account for the possibility, the data cache 18 may perform "back probes" to each way when a fill is to be written the data cache 18, to invalidate the potentially duplicate (alias) cache line. In one embodiment, the external interface unit 22 may transmit the fill address at least N clocks before the fill data is ready to be written to the data cache 18, where N is an integer greater than or equal to the number of ways in the data cache 18. During the N clocks, the back probes may be performed to eliminate the potential alias cache line. The data cache 18 may provide the fill alias index for each back probe (FillAlias Idx in FIG. 1) for matching against the load queue 24 Idx fields, and the Snoop/Fill Way may indicate the way of the back probe. If a match is detected on a load queue 24 entry (index and way), the back probe hits in the data cache, and the data cache hit status for the entry indicates hit, the control unit 26 may update the data cache hit status to indicate not hit in that entry.

With data cache hit status monitoring in place, the detecting of snoop hits on loads may be performed in the load queue 24. The external interface unit 22 may provide the snoop index to the load queue 24 (Snoop/Fill Idx in FIG. 1), may indicate that a snoop is occurring (Snoop/Fill Ctl in FIG. 1), and may provide the snoop address to the data cache 18 (Snoop/Fill Addr in FIG. 1). The data cache 18 may signal a snoop hit or miss to the control unit 28 (Snoop Hit in FIG. 1) and may provide the way hit by the snoop to the load queue 24 (Snoop/Fill Way in FIG. 1). If a snoop hit is detected in the data cache 18, the snoop index matches the Idx field, the snoop way matches the way field, and the data cache hit status is hit, then a snoop hit is detected for that load. If the data cache hit status is not hit, then a snoop hit is detected for the load if the Idx field matches the snoop index, independent of the snoop hit/miss in the cache.

It is noted that, while the index, way, and hit indications are shown as separate signalling paths in FIG. 1, the paths may be shared paths. For example, if a given index of one type (e.g. the FillAlias index) and another type (e.g. the Snoop/Fill index) cannot be provided at the same time, a shared path may be used. Similarly, if ways of different types cannot be provided at the same time or two hits of different types cannot be signalled at the same time, a shared path/hit signal may be used.

This description generally refers to the control unit being configured to perform various operations (or simply refers to the control unit performing various operations). Generally, the control unit comprises circuitry that implements the operations. The circuitry may comprise any combination of combinatorial logic, state machines, pipelines, clocked storage devices such as registers, flops, latches, etc. Similarly, any other unit or component described as configured to perform an operation or simply performing an operation may comprise circuitry that implements the operation.

Figure 2:
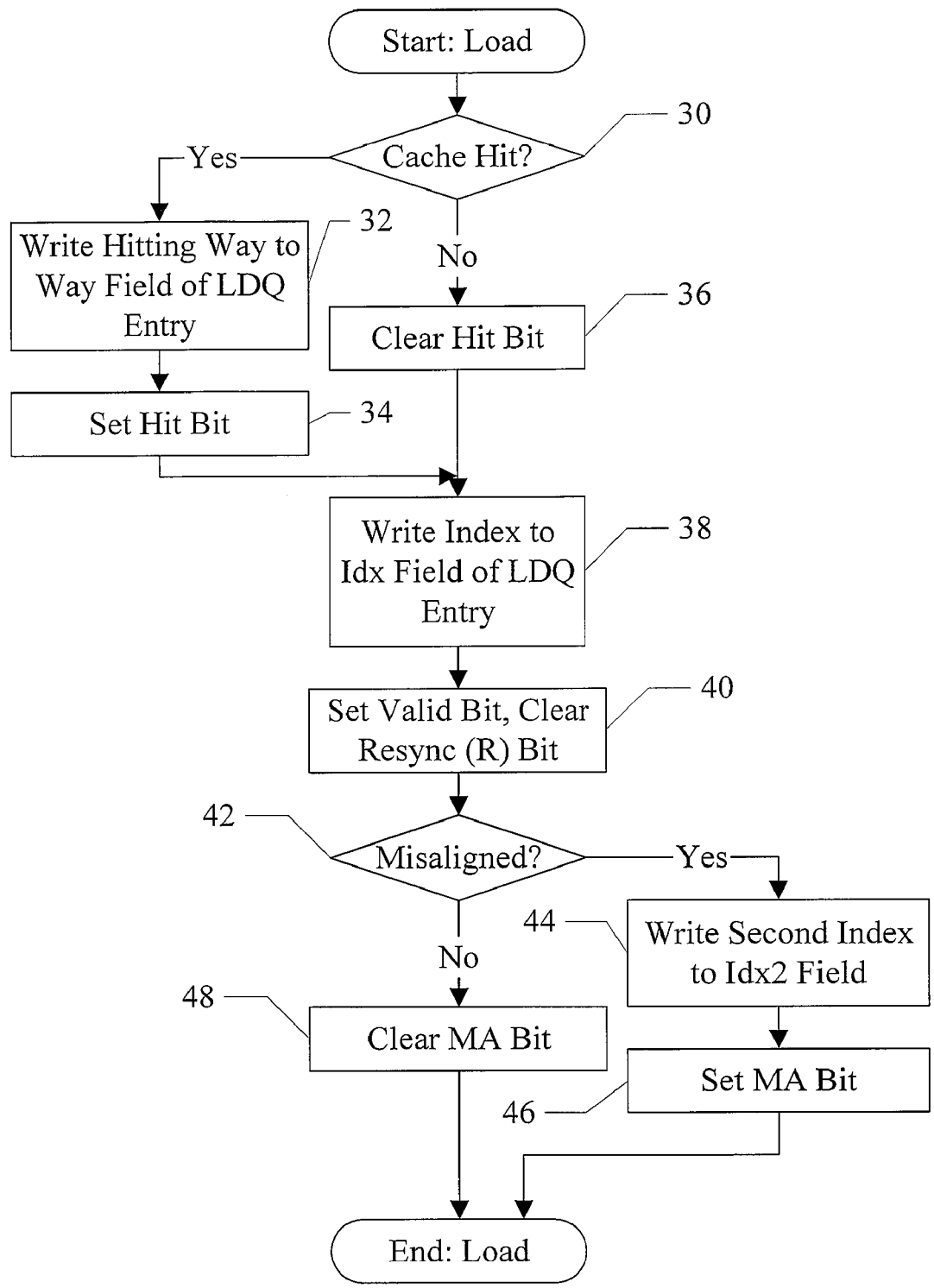
FIG. 2 is a flowchart illustrating operation of one embodiment of the processor during execution of a load.

Turning now to FIG. 2, a flowchart is shown illustrating operation of one embodiment of the processor 10 during execution of a load. The processor 10 (and more particularly, the LSU 20, and even more particularly the control unit 26) may comprise circuitry that implements the operation shown in FIG. 2. While the blocks are shown in a particular order for ease of understanding, other orders may be used. Additionally, blocks may be performed in parallel in combinatorial logic circuitry. Blocks, combinations of blocks, and/or the flowchart as a whole may be pipelined over multiple clock cycles.

The load may access the data cache 18, and the data cache 18 may signal hit/miss of the load. If the load is a cache hit (decision block 30, "yes" leg), the control unit 26 may write the hitting way to the load queue 24 entry assigned to the load (block 32) and may set the hit bit (block 34). If the load is not a cache hit (decision block 30, "no" leg), the control unit 26 may clear the hit bit (block 36). In either case, the control unit 26 may write the load index to the Idx field of the load queue entry assigned to the load (block 38), set the valid bit in the entry, and clear the resync bit in entry (block 40).

If the load is misaligned (decision block 42, "yes" leg), the control unit 26 may write the second index (for the second half of the misaligned load) to the Idx2 field of the load queue entry assigned to the load (block 44) and may set the MA bit in the entry (block 46). Otherwise (decision block 42, "no" leg), the control unit 26 may clear the MA bit in the entry (block 48).

Figure 3:
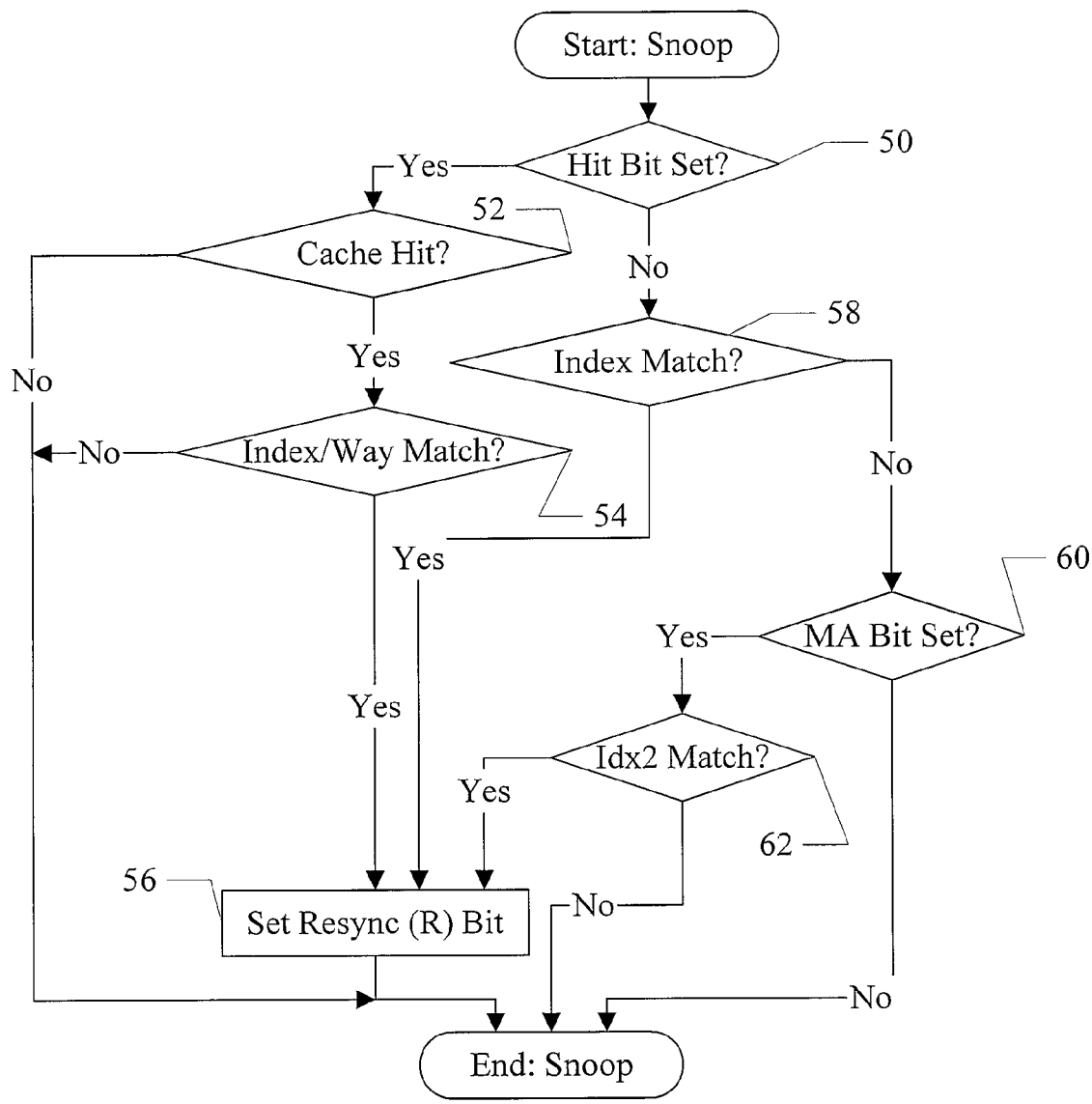
FIG. 3 is a flowchart illustrating operation of one embodiment of the processor for a snoop.

FIG. 3 is a flowchart illustrating operation of one embodiment of the processor 10 for a snoop operation. The processor 10 (and more particularly, the LSU 20, and even more particularly the control unit 26) may comprise circuitry that implements the operation shown in FIG. 3. While the blocks are shown in a particular order for ease of understanding, other orders may be used. Additionally, blocks may be performed in parallel in combinatorial logic circuitry. Blocks, combinations of blocks, and/or the flowchart as a whole may be pipelined over multiple clock cycles. The operation illustrated in FIG. 3 may occur in parallel for each valid entry in the load queue 24.

If the hit bit is set in the entry (decision block 50, "yes" leg), the data cache hit status is hit and thus a snoop hit occurs if the snoop is a cache hit and the snoop index and way (for the hit) match the load index and load way. Otherwise, no snoop hit is detected in the load queue. Accordingly, if the snoop is a cache hit (decision block 52, "yes" leg) and the snoop index and snoop way match the index (Idx) and way (Way) in the entry (decision block 54, "yes" leg), the control unit 26 may set the resync (R) bit in the entry (block 56).

If the hit bit is clear in the entry (decision block 50, "no" leg), the data cache hit status is not hit. Thus, a snoop hit is presumed if the snoop index matches the load index (decision block 58, "yes" leg) and the control unit 26 sets the resync bit in the entry (block 56). If the load is misaligned (MA bit set in the entry—decision block 60, "yes" leg), a snoop hit is presumed if the second index (Idx2) matches the snoop index (decision block 62, "yes" leg) and the control unit 26 sets the resync bit in the entry (block 56).

FIG. 4 is a truth table illustrating the operation illustrated in flowchart form in FIG. 3. The truth table 64 illustrates the setting of the R bit based on matching the Idx field of the entry. The hit bit column indicates the state of the hit bit in the entry; the cache hit column indicates whether the snoop is a cache hit or not; the index match column indicates whether or not the Idx field matches the snoop index; the way match column indicates whether or not the Way field matches the snoop way, and the R bit column indicates the resulting state of the R bit. An "x" indicates a "don't care" state. Note that the R bit is sticky, in this embodiment: once the R bit is set it remains set until the entry is reassigned to another load (or at least until the entry is invalidated, e.g., when the load is retired or otherwise removed from the load queue 24). The truth table 66 illustrates the setting of the R bit for a misaligned load. The MA bit column indicates the MA bit in the entry; the index2 match column indicates whether or not the snoop index matches the Idx2 field of the entry; and the R bit column again indicates the resulting state of the R bit.

Figure 5:
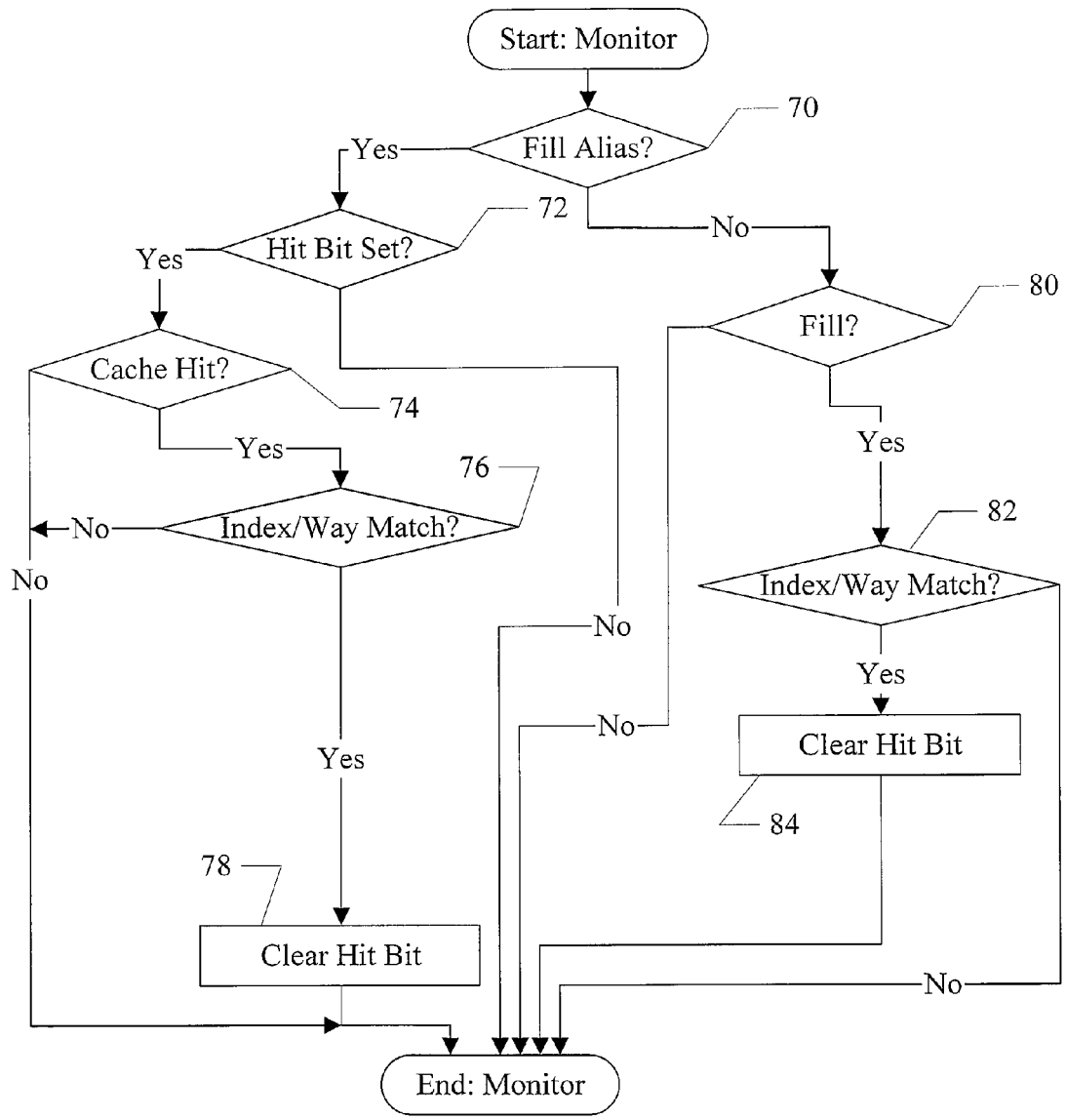
FIG. 5 is a flowchart illustrating operation of one embodiment of the processor to monitor loads in the load queue.

FIG. 5 is a flowchart illustrating operation of one embodiment of the processor to monitor the data cache hit status (in this case, indicated by the hit bit) for loads represented in the load queue. The processor 10 (and more particularly, the LSU 20, and even more particularly the control unit 26) may comprise circuitry that implements the operation shown in FIG. 5. While the blocks are shown in a particular order for ease of understanding, other orders may be used. Additionally, blocks may be performed in parallel in combinatorial logic circuitry. Blocks, combinations of blocks, and/or the flowchart as a whole may be pipelined over multiple clock cycles. The operation illustrated in FIG. 5 may occur in parallel for each valid entry in the load queue 24.

If a fill alias is being probed via a back probe by the data cache 18 (decision block 70, "yes" leg), the hit bit is set in the entry (decision block 72, "yes" leg), the back probe is a cache hit (decision block 74, "yes" leg), and the fill alias index and hitting way match the Idx and Way fields of the entry, respectively (decision block 76, "yes" leg) the cache line hit by the load represented in the entry is being invalidated by the back probe. The control unit 26 may thus clear the hit bit, (thus setting the data cache hit status to not hit) (block 78). If the hit bit is set (decision block 72, "yes" leg) but the back probe is a cache miss (decision block 74, "no" leg) or at least one of the index and way match is not detected (decision block 76, "no" leg), the hit bit is unaffected. Similarly, if the hit bit is clear (decision block 72, "no" leg), the hit bit is unaffected. It is noted that, in this case, the alias is being invalidated so that the same cache line may be written to another way. Other embodiments may update the Way field of the entry to indicate the way into which the cache line is filled instead of clearing the hit bit.

If a cache fill is completing (decision block 80, "yes" leg), the cache line hit IS by the load is being evicted if the index and way match the fill index and fill way (decision block 82, "yes" leg), independent of the cache hit status indicated by the data cache 18 for the fill. Thus, the hit bit is cleared (block 84). Otherwise, the hit bit is unaffected.

FIG. 6 is a truth table illustrating the operation illustrated in flowchart form in FIG. 5. The truth table 90 illustrates detecting an alias match for a back probe. The hit bit column indicates the state of the hit bit in the entry; the cache hit column indicates whether the back probe is a cache hit or not; the index match column indicates whether or not the Idx field matches the fill alias index; the way match column indicates whether or not the Way field matches the fill way, and the alias match column indicates whether or not an alias match is detected. An "x" indicates a "don't care" state. The truth table 92 illustrates detecting a fill match for the cache fill itself The hit bit, index match, and way match columns are similar to truth table 90, and the fill match column indicates whether or not a fill match is detected. Finally, truth table 94 includes a hit bit column indicating the current state of the hit bit, the alias match and fill match results from tables 90 and 92, and the new hit bit value.

It is noted that the description of FIGS. 2-6 refer to certain embodiments that represent the data cache hit status with the hit bit. However, other embodiments may represent the data cache hit status with any desired form.

Numerous variations and modifications will become apparent to those skilled in the art once the above disclosure is fully appreciated. It is intended that the following claims be interpreted to embrace all such variations and modifications.

What is claimed is:

1. A processor comprising:
a data cache; and
a load/store unit (LSU) coupled to the data cache, and the LSU comprises a queue, and each entry in the queue is assigned to a different load that, if the entry is marked valid, has accessed the data cache but has not retired, and the LSU further comprises a control unit coupled to the queue, and the control unit is configured to update a data cache hit status of each load represented in the queue as a content of the data cache changes in response to snoop operations and other operations, and the LSU is coupled to receive a snoop index corresponding to a snoop operation received by the processor, and the control unit is configured to detect a snoop hit on a first load in a first entry of the queue responsive to: the snoop index matching a load index stored in the first entry, the data cache hit status of the first load indicating hit, the data cache detecting a snoop hit for the snoop operation, and a load way stored in the first entry matching a first way of the data cache in which the snoop operation is a hit; and the load way is a way of the data cache in which the load hits, and wherein the control unit is configured to update the data cache hit status of the first load to indicate not hit responsive to an invalidation of a cache line that is hit by the first load in the data cache.

2. The processor as recited in claim 1 and the control unit is further configured to detect a snoop hit on the first load responsive to the snoop index matching the load index and the data cache hit status of the first load indicating not hit.

3. The processor as recited in claim 2 and the control unit is configured to set the data cache hit status of the first load to not hit responsive to a cache miss when the first load accesses the cache.

4. The processor as recited in claim 2 and the control unit is configured to set the data cache hit status of the first load to not hit responsive to a fill hit on the first load in the queue.

5. The processor as recited in claim 1 and, in response to the first load being misaligned, a second index is stored in the first entry, and the load index corresponds to a first portion of the misaligned load and the second index corresponds to a second portion of the misaligned load.

6. The processor as recited in claim 5 and the data cache hit status corresponds to the first portion of the misaligned load and the load way corresponds to the first portion of the misaligned load.

7. The processor as recited in claim 6 and the control unit is further configured to detect a snoop hit on the first load in response to the second index matching the snoop index and the first load being misaligned.

8. A method comprising:
accessing a data cache for a first load in a processor;
storing a data cache hit status in a first entry of a queue, and the first load is assigned to the first queue entry;
updating the data cache hit status as a content of the data cache changes in response to snoop operations and other operations, wherein the updating comprises updating the data cache hit status of the first load to indicate not hit responsive to invalidating a cache line that is hit by the first load in the data cache;

receiving a snoop index corresponding to a snoop operation in the processor; and detecting a snoop hit on the first load responsive to: the snoop index matching a load index stored in the first entry, the data cache hit status of the first load indicating hit, the data cache detecting a snoop hit for the snoop operation, and a load way stored in the first entry matching a first way of the data cache in which the snoop operation is a hit;

and the load way is a way of the data cache in which the load hits.

9. The method as recited in claim 8 further comprising detecting a snoop hit on a second load responsive to the snoop index matching a second load index in a second entry of the queue that is assigned to the second load and a second data cache hit status of the second load indicating not hit.

10. The method as recited in claim 9 further comprising setting the second data cache hit status to not hit responsive to a cache miss when the second load accesses the cache.

11. The method as recited in claim 9 further comprising setting the second data cache hit status to not hit responsive to a fill hit on the second load in the queue.

12. The method as recited in claim 8 further comprising, in response to the first load being misaligned, storing a second index in the first entry, and the load index corresponds to a first portion of the misaligned load and the second index corresponds to a second portion of the misaligned load.

13. The method as recited in claim 12 and the data cache hit status corresponds to the first portion of the misaligned load and the load way corresponds to the first portion of the misaligned load.

14. The method as recited in claim 13 further comprising detecting a snoop hit on the first load in response to the second index matching the snoop index and the first load being misaligned.

15. A processor comprising:
a data cache; and
a load/store unit (LSU) coupled to the data cache, and the LSU comprises a queue, and each entry in the queue is assigned to a different load that, if the entry is marked valid, has accessed the data cache but has not retired, and the LSU further comprises a control unit coupled to the queue, and the control unit is configured to update a data cache hit status of each load represented in the queue as a content of the data cache changes in response to snoop operations and other operations, and the LSU is coupled to receive a snoop index corresponding to a snoop operation received by the processor, and the control unit is configured to detect a snoop hit on a first load in a first entry of the queue in at least two cases: (i) responsive to the snoop index matching a load index stored in the first entry, the data cache hit status of the first load indicating hit, and the data cache detecting a snoop hit for the snoop operation; and (ii) responsive to the snoop index matching the load index and the data cache hit status of the first load indicating not hit, independent of whether or not the snoop operation hits in the data cache, and the control unit is configured to update the data cache hit status of the first load to indicate not hit responsive to an invalidation of a cache line that is hit by the first load in the data cache.

16. The processor as recited in claim 15 and the data cache is set associative comprising a plurality of ways, and the first entry is configured to store a load way indicating which of the plurality of ways the first load hits, and wherein case (i) is further responsive to the load way matching a first way of the cache in which the snoop hit is detected.

17. The processor as recited in claim 15 and the control unit is configured to set the data cache hit status of the first load to not hit responsive to: (i) a cache miss when the first load accesses the cache; or (ii) a fill hit on the first load in the queue.

18. The processor as recited in claim 15 and, in response to the first load being misaligned, a second index is stored in the first entry, and the load index corresponds to a first portion of the misaligned load and the second index corresponds to a second portion of the misaligned load, and the data cache hit status corresponds to the first portion of the misaligned load, and the control unit is further configured to detect a snoop hit on the first load in response to the second index matching the snoop index and the first load being misaligned.

* * * * *